United States Patent
V et al.

(10) Patent No.: US 10,451,043 B2
(45) Date of Patent: Oct. 22, 2019

(54) HYBRID TUBULAR LATTICE TOWER ASSEMBLY FOR A WIND TURBINE

(71) Applicant: General Electric Company, Schenectady, NY (US)

(72) Inventors: Raghunandan C V, Bangalore (IN); Giridhar Nagraj Ron, Bangalore (IN); Vajralingam Bennuri, Bangalore (IN)

(73) Assignee: General Electric Company, Schenectady, NY (US)

( * ) Notice: Subject to any disclaimer, the term of this patent is extended or adjusted under 35 U.S.C. 154(b) by 622 days.

(21) Appl. No.: 15/148,049

(22) Filed: May 6, 2016

(65) Prior Publication Data

US 2017/0321659 A1    Nov. 9, 2017

(51) Int. Cl.
| | |
|---|---|
| *E04C 3/36* | (2006.01) |
| *F03D 13/20* | (2016.01) |
| *E04H 12/10* | (2006.01) |
| *F03D 1/06* | (2006.01) |
| *E04H 12/00* | (2006.01) |

(52) U.S. Cl.
CPC ................ *F03D 13/20* (2016.05); *E04C 3/36* (2013.01); *E04H 12/10* (2013.01); *F03D 1/0666* (2013.01); *E04H 2012/006* (2013.01); *F05B 2240/912* (2013.01); *F05B 2240/9121* (2013.01); *Y02E 10/721* (2013.01); *Y02E 10/728* (2013.01)

(58) Field of Classification Search
None
See application file for complete search history.

(56) References Cited

U.S. PATENT DOCUMENTS

| | | | | | |
|---|---|---|---|---|---|
| 2,705,061 | A | * | 3/1955 | Getz ....................... | E04H 12/10 343/883 |
| 3,665,670 | A | * | 5/1972 | Rummler .............. | E04B 1/1903 403/231 |
| 4,694,630 | A | * | 9/1987 | McGinnis ............... | E04H 12/10 52/648.1 |

(Continued)

FOREIGN PATENT DOCUMENTS

| | | | | |
|---|---|---|---|---|
| EP | 2067914 A2 | * | 6/2009 | ......... E02B 17/0004 |
| EP | 1813808 B1 | | 1/2011 | |
| EP | 2690221 A1 | * | 1/2014 | ......... E02B 17/0004 |

*Primary Examiner* — Carlos A Rivera
*Assistant Examiner* — Theodore C Ribadeneyra
(74) *Attorney, Agent, or Firm* — Dority & Manning, P.A.

(57) ABSTRACT

The present disclosure is directed to a tower assembly for a wind turbine. The tower assembly includes a lattice tower portion, a tubular tower portion, and a transition region therebetween. The lattice tower portion includes a plurality of structural members connected together to define an open lattice tower. Further, the structural members include a plurality of supports and a plurality of cross-support members. The cross-support members are connected between the supports so as to define one or more openings. The tubular tower portion includes a lower portion and an upper portion. The first transition region includes a single-piece connection structure, a plurality of arm members, and a plurality of node connectors. The connection structure has a circumferential body configured to receive the lower portion of the tubular tower portion therein. Further, the node connectors join the plurality of supports of the lattice tower portion to the connection structure via the plurality of arm members.

13 Claims, 12 Drawing Sheets

(56) References Cited

U.S. PATENT DOCUMENTS

| | | | |
|---|---|---|---|
| 4,941,775 A * | 7/1990 | Benedict | C23F 13/02 204/196.17 |
| 7,276,808 B2 | 10/2007 | Weitkamp et al. | |
| 2008/0028715 A1* | 2/2008 | Foss | E02B 17/0004 52/651.01 |
| 2009/0249707 A1* | 10/2009 | Curme | E04H 12/10 52/40 |
| 2010/0281818 A1* | 11/2010 | Southworth | E02D 27/42 52/745.17 |
| 2011/0154812 A1* | 6/2011 | Butler | F01N 13/08 60/324 |
| 2013/0001954 A1* | 1/2013 | Garc A Maestre | F03D 13/20 290/55 |
| 2014/0075864 A1* | 3/2014 | Foss | E04H 12/00 52/223.4 |
| 2014/0086691 A1* | 3/2014 | Reales | E02B 17/0004 405/224 |
| 2015/0107181 A1* | 4/2015 | Larsen | E04B 1/1903 52/655.1 |
| 2015/0152664 A1* | 6/2015 | Larsen | B21C 37/296 52/651.07 |
| 2015/0218840 A1* | 8/2015 | Paton | E04H 12/08 52/651.01 |
| 2015/0337517 A1* | 11/2015 | Hall | E02B 17/02 405/227 |
| 2015/0354203 A1* | 12/2015 | Drewes | E04B 1/40 52/651.01 |
| 2016/0230745 A1* | 8/2016 | Patberg | F03D 80/70 |

* cited by examiner

HYBRID TUBULAR LATTICE TOWER ASSEMBLY FOR A WIND TURBINE

FIELD OF THE INVENTION

The present invention relates generally to wind turbines, and more particularly to an improved hybrid tubular lattice tower assembly for a wind turbine.

BACKGROUND OF THE INVENTION

Conventional wind turbine towers typically include a tubular pole or a lattice structure to support a wind turbine at a considerable height to capture wind energy. The tubular pole configuration is relatively more simple and easier to assemble than the lattice structure. However, tubular poles use more steel than the lattice structure, resulting in a cost disadvantage with rising prices of steel.

Thus, lattice tower structures can have potential as an alternative to the tubular poles, especially for higher hub height applications and for wind turbines located in wind farms having challenging logistic requirements. For example, transporting the tubular tower sections to the site can be challenging because the sections can be twenty plus meters long and over four meters in diameter. As such, in some instances, a dedicated road is needed, but may not be possible. Accordingly, lattice tower structures may be utilized since they do not experience the same transportation issues as tubular towers.

Figures 1, 2:
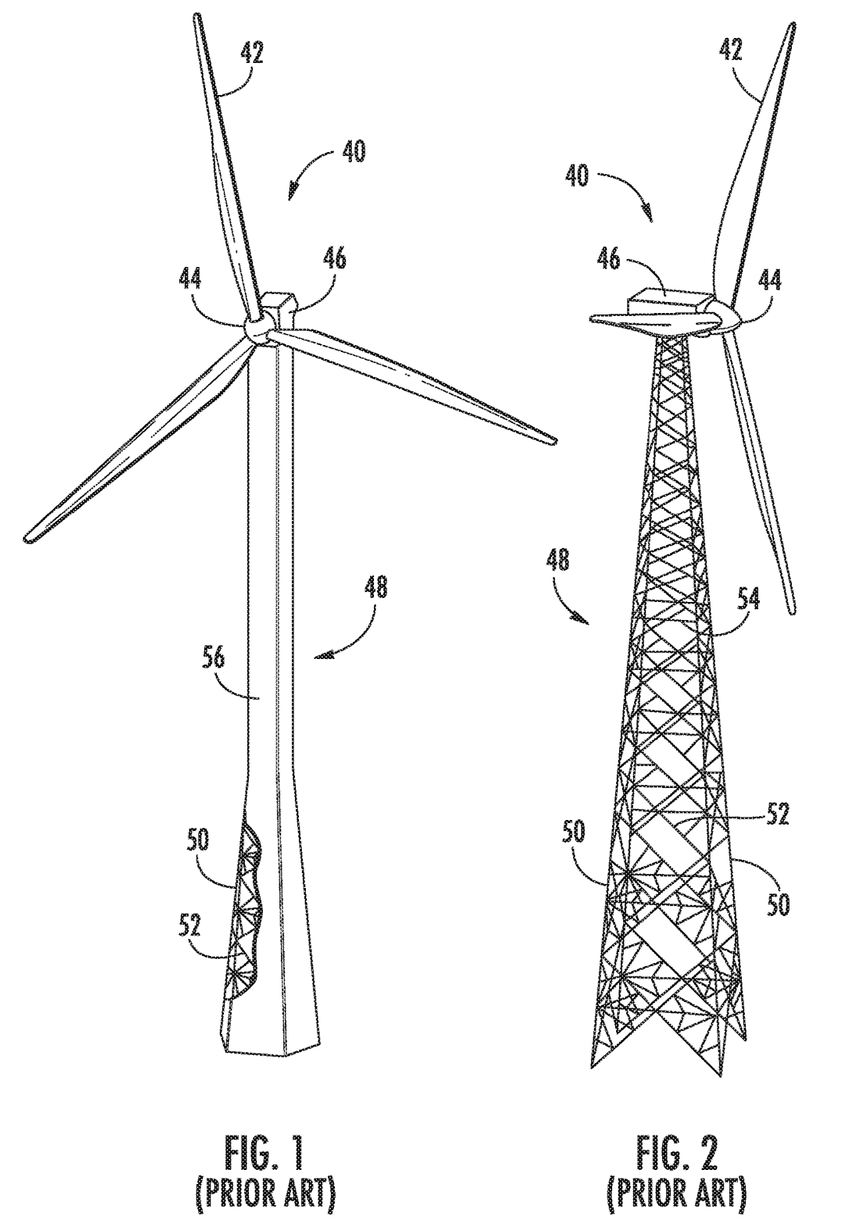
FIG. 1 illustrates a perspective view of a wind turbine with a lattice tower structure according to conventional construction.
FIG. 2 illustrates a perspective view of another wind turbine with a lattice tower structure according to conventional construction.
Figure 3:
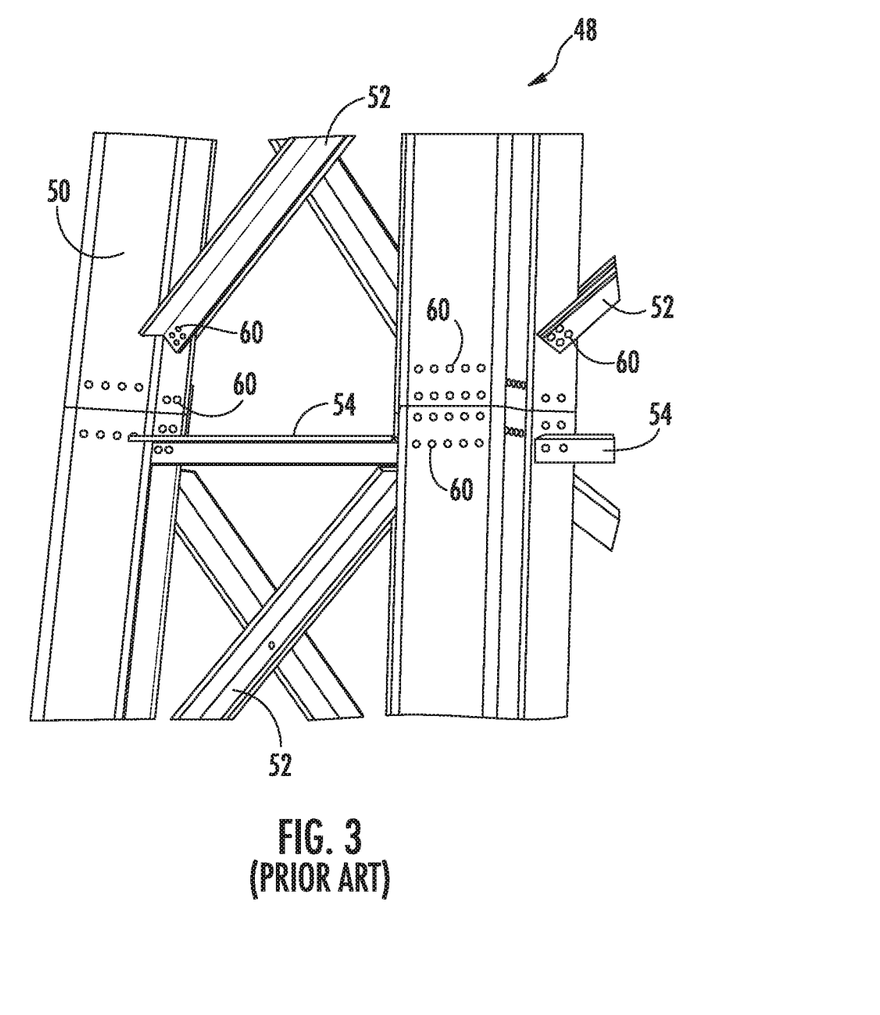
FIG. 3 illustrates a detailed perspective view of structural members of a conventional lattice tower of a wind turbine.

For example, FIGS. 1 and 2 illustrate perspective views of a plurality of wind turbines 40 having a lattice tower structure 48 known in the art. As shown, the wind turbines 40 include a plurality of blades 42 mounted to a rotor hub 44, which in turn is rotationally supported by power generation components housed within a nacelle 46, as is well known in the art. The nacelle 46 is supported at the top of the lattice tower structure 48, which in the illustrated embodiments is formed by legs 50, horizontal braces 54, and diagonal braces 52. The legs 50 are typically angle iron members or pipe members, and the braces 52, 54 are typically angle iron members. The vertical supports (legs 50) are typically provided for bending loads, whereas the cross support-members 52, 54 connect the legs 50 and are typically provided for torsional loads. These lattice frame tower structures 48 are also referred to in the art as "space frame" towers. The lattice tower structure 48 may be fabricated in sections and erected at the wind turbine site. FIG. 3 is a more detailed view of the structural members of the lattice structure tower 48, and particularly illustrates the connection locations between the braces 52, 54 and the legs 50, as well as between aligned sections of the legs 50. Typically, a plurality of bolt connections 60 are utilized at these various connection locations.

Certain modern wind turbines may have a hybrid configuration including both steel tubular portions and a lattice frame structure. Such hybrid towers are particularly advantageous to accommodate higher hub heights. Previous hybrid towers, however, typically include a plurality of welded joints, particularly at the transition between the steel tubular portion and the lattice frame structure.

Accordingly, an improved hybrid tubular lattice tower assembly for a wind turbine that addresses the aforementioned problems would be desired in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a tower assembly for a wind turbine. The tower assembly includes a lattice tower portion, a tubular tower portion, and a transition region therebetween. The lattice tower portion includes a plurality of structural members connected together to define an open lattice tower. Further, the structural members include a plurality of supports and a plurality of cross-support members. The cross-support members are connected between the supports so as to define one or more openings. The tubular tower portion includes a lower portion and an upper portion. The first transition region includes a single-piece connection structure, a plurality of arm members, and a plurality of node connectors. The connection structure has a circumferential body configured to receive the lower portion of the tubular tower portion therein. Thus, the node connectors are configured to join the plurality of supports of the lattice tower portion to the connection structure via the plurality of arm members.

In one embodiment, the connection structure is formed via casting. In another embodiment, the connection structure may include a plurality of connection points configured to receive the plurality of arm members. For example, in particular embodiments, the connection structure may include more than four connection points, such as eight connection points, or more preferably twelve connection points. More specifically, in certain embodiments, each of the connection points may include a flange.

In further embodiments, the tower assembly may include a plurality of flanged components configured with either or both of the plurality of arm members or the plurality of supports. For example, in one embodiment, each of the arm members may include one of the flanged components at each end thereof so as to connect the arm members to the flanges of the connection points of the connection structure. In additional embodiments, the flanged components may be joined to the plurality of arm members and/or the plurality of supports via welding, one or more fasteners, or any other suitable means.

In another embodiment, the tower assembly may include one or more panel elements. Further, the flanged components may include at least one wing. Thus, in such embodiments, at least one of the plurality of arm members or the plurality of supports may be mounted to the wing of the flanged component and the panel element. In addition, at least one of the plurality of arm members or the plurality of supports may have a hollow cross-section having a solid block configured therein. As such, the portion of the arm members or the supports containing the block may be mounted to the wing.

In additional embodiments, the tower assembly may also include at least one tapered spacer configured at an upper portion of the lattice tower portion between adjacent flange components.

In another embodiment, the node connectors may each include at least three node connections. More specifically, in certain embodiments, the tower assembly may include at least four least node connectors spaced evenly apart, with each node connector having at least three node connections.

In yet another embodiment, the tower assembly may further include a second transition region configured between the tubular tower portion and the nacelle. For example, in certain embodiments, the second transition region may include a tubular portion that that tapers in diameter towards the nacelle.

In another aspect, the present disclosure is directed to a wind turbine. The wind turbine includes a tower assembly having a lattice tower portion, a tubular tower portion, and a transition region therebetween. The lattice tower portion includes a plurality of structural members connected together to define an open lattice tower. Further, the structural members include a plurality of supports. The tubular tower portion includes a lower portion and an upper portion. The first transition region includes a single-piece connection structure, a plurality of arm members, and a plurality of node connectors. The connection structure has a circumferential body configured to receive the lower portion of the tubular tower portion therein. Thus, the node connectors are configured to join the plurality of supports of the lattice tower portion to the connection structure via the plurality of arm members. The wind turbine also includes a nacelle mounted atop the tower assembly and a rotor having a rotatable hub and at least one rotor blade mounted to the nacelle. It should be understood that the wind turbine may be further configured with any of the additional features as described herein.

In yet another aspect, the present disclosure is directed to a tower assembly. The tower assembly includes a first tower portion, a second tower portion, and a transition region configured therebetween. The first tower portion includes a plurality of supports. The second tower portion includes a lower portion and an upper portion. The transition region includes a single-piece connection structure, a plurality of arm members, and a plurality of node connectors. The connection structure has a circumferential body configured to receive the lower portion of the second tower portion therein. The node connectors are configured to join the plurality of supports of the first tower portion to the connection structure via the plurality of arm members. It should be understood that the tower assembly may be further configured with any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a hybrid tower assembly for a wind turbine. The tower assembly includes a lattice tower portion, a tubular tower portion, and a transition region therebetween. The lattice tower portion includes a plurality of structural members connected together to define an open lattice tower. Further, the structural members include a plurality of supports. The tubular tower portion includes a lower portion and an upper portion. The first transition region includes a single-piece connection structure, a plurality of arm members, and a plurality of node connectors. The connection structure has a circumferential body configured to receive the lower portion of the tubular tower portion therein. Further, the node connectors are configured to join the plurality of supports of the lattice tower portion to the connection structure via the plurality of arm members.

The present disclosure provides various advantages not present in the prior art. For example, the present disclosure provides a tower assembly that can be easily assembled to accommodate any suitable height, particularly heights above 130 meters. Further, the tower assembly of the present disclosure is not limited in diameter due to the combination of the lattice tower portion and the tubular tower portion. As such, the tower assembly of the present disclosure reduces transportation costs over prior art towers.

Figure 4:
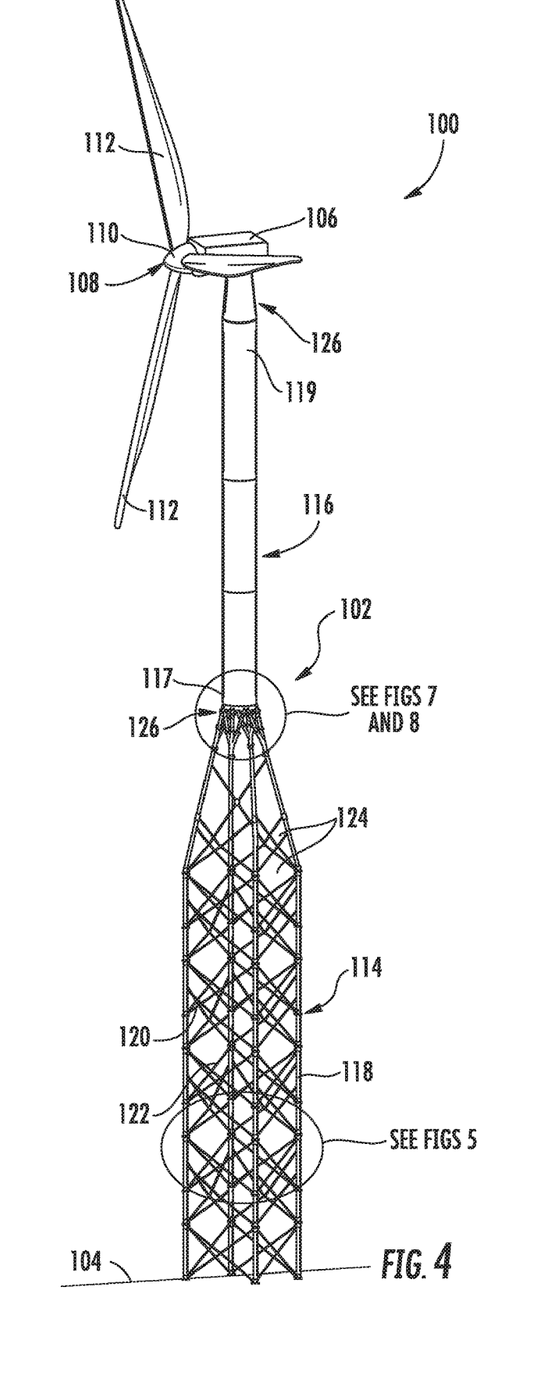
FIG. 4 illustrates a perspective view of one embodiment of a wind turbine having a hybrid tower assembly according to the present disclosure.

Referring now to the drawings, FIGS. 4-14 illustrate various views and components of a tower assembly 102 according to the present disclosure. More specifically, FIG. 4 illustrates a perspective view of one embodiment of a wind turbine 100 having the tower assembly 102 extending from a support surface 104, a nacelle 106 mounted on the tower assembly 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

Figure 5:
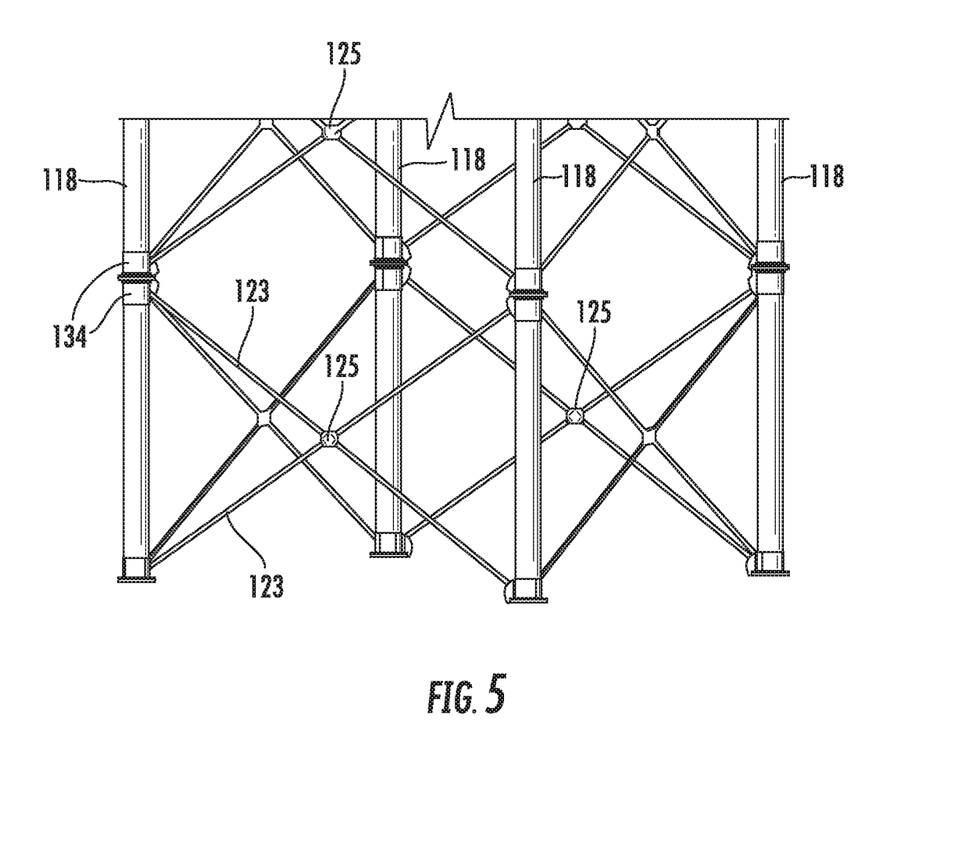
FIG. 5 illustrates a detailed perspective view of a portion of the tower assembly of FIG. 4.
Figure 7:
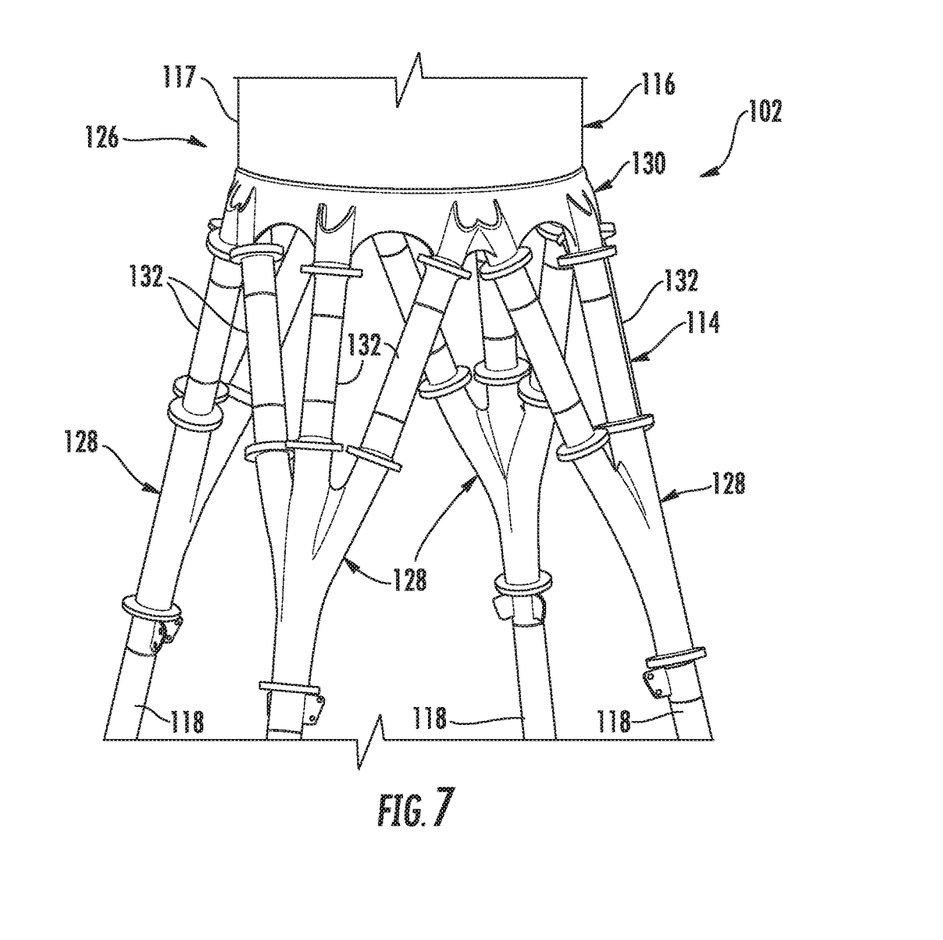
FIG. 7 illustrates a detailed perspective view of one embodiment of another transition region of the tower assembly of FIG. 4.
Figure 8:
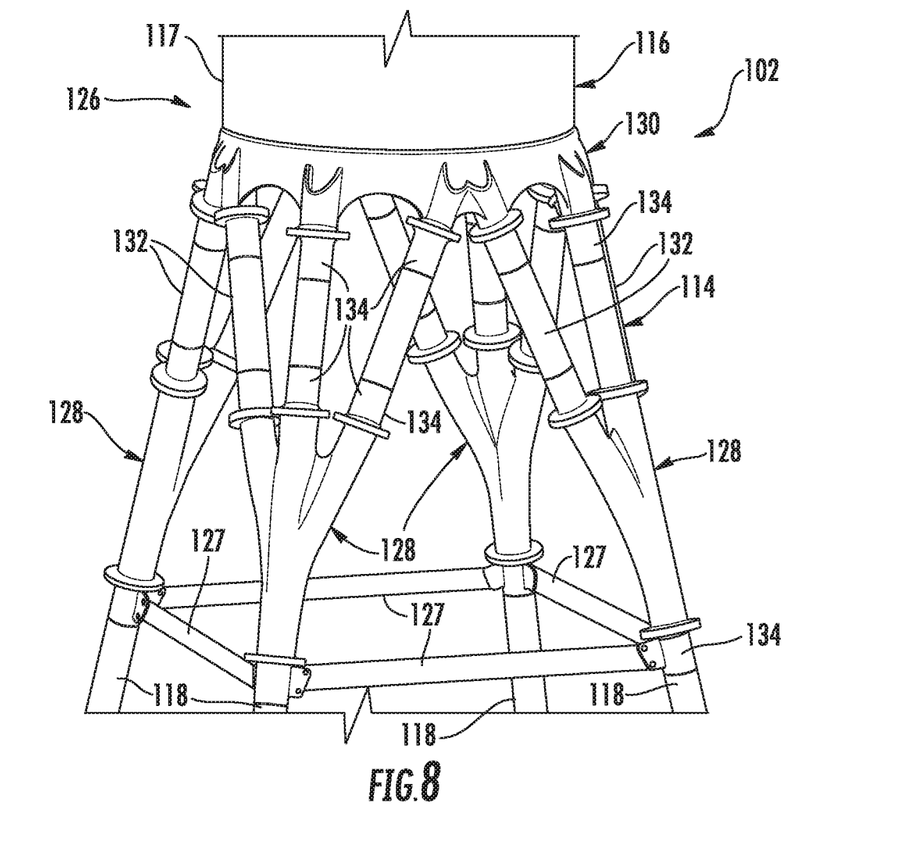
FIG. 8 illustrates a detailed perspective view of the tower assembly of FIG. 4, particularly illustrating additional horizontal support beams configured between the supports of the lattice tower portion.

Further, as shown in FIGS. 4, 7, and 8, the tower assembly 102 includes a lattice tower portion 114 and a tubular tower portion 116. More specifically, as shown in FIG. 4, the lattice tower portion 114 of the tower assembly 102 includes a plurality of supports or legs 118, inner cross-support members 120, outer cross-support members 122, and optional horizontal support members 127. Alternatively, as shown in FIG. 5, the cross-support members 123 may be joined together at a centralized point 125, i.e. rather than crossing in front or behind one another. Further, as shown, the supports 118 typically extend in a generally vertical direction from the support surface 104, whereas the cross-support members 120, 122, 123 generally extend diagonally with respect to the support surface 104. More specifically, as shown, the cross-support members 120, 122, 123 are typically connected between the supports 118 so as to define one or more openings 124. In addition, as shown in FIG. 4, the tubular tower portion 116 includes a lower portion 117 and an upper portion 119.

Figure 6:
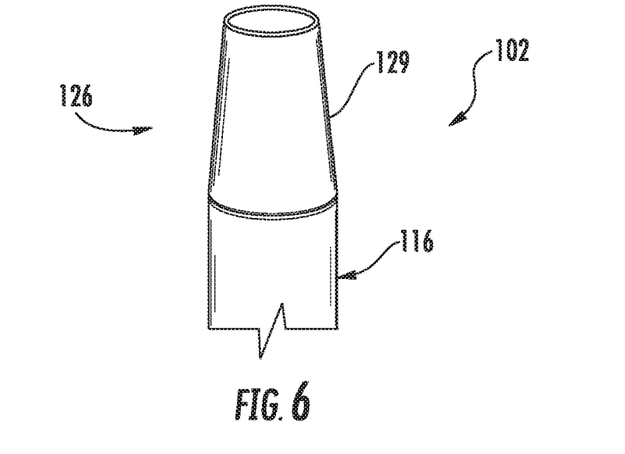
FIG. 6 illustrates a detailed perspective view of one of the transition regions of the tower assembly of FIG. 4.

Referring particularly to FIGS. 4-7, the tower assembly 102 may also include one or more transition regions 126 between the tubular tower portion 116 and the nacelle 106 and/or between the lattice tower portion 114 and the tubular tower portion 116. More specifically, as shown in FIGS. 4 and 7-8, a first transition region 126 may be located between the lattice tower portion 114 and the tubular tower portion 116. In addition, as shown in FIGS. 4 and 6, a second transition region 126 may include a tubular portion 129 configured between the tubular tower portion 116 and the nacelle 106 that tapers or narrows in diameter towards the nacelle 106.

Figure 9:
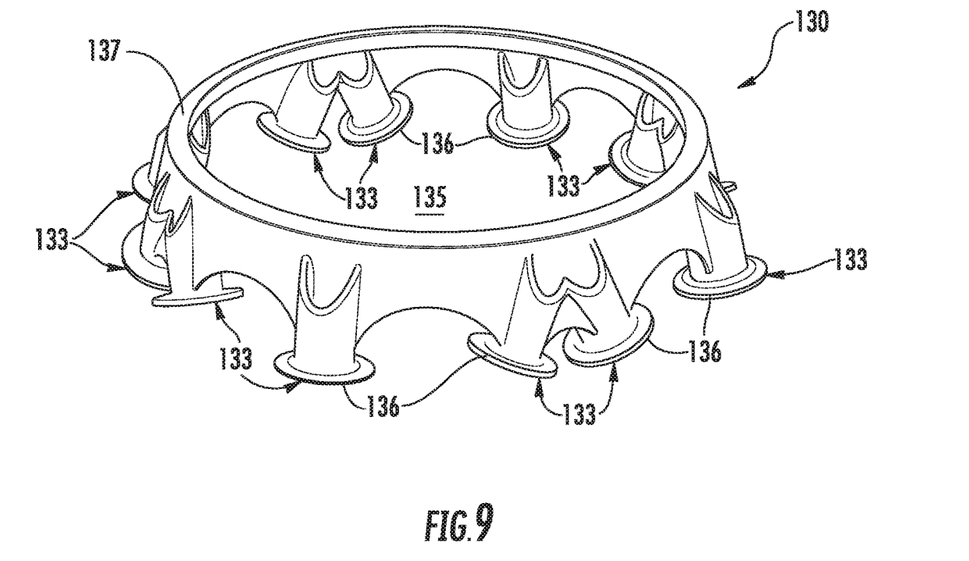
FIG. 9 illustrates a perspective view of one embodiment of a connection structure of a tower assembly according to the present disclosure.

Referring particularly to FIGS. 7-9, the first transition region 126 includes a single-piece connection structure 130, a plurality of arm members 132, and a plurality of node connectors 128. More specifically, in certain embodiments, the connection structure 130 has a circumferential body 137 that may be formed via casting or any other suitable manufacturing method that provides a single-piece structure with the desired strength for the various components of the transition region 126 to be connected to the connection structure 130. Further, as shown in FIGS. 7 and 8, the circumferential body 137 is configured to receive the lower portion 117 of the tubular tower portion 116 therein, e.g. within an opening 135 thereof. In addition, as shown, the connection structure 130 may include a plurality of connection points 133 configured to receive the plurality of arm members 132. More specifically, as shown in FIG. 9, each of the connection points 133 may include a flange 136 that allows for easy connection of adjacent components.

Figure 10:
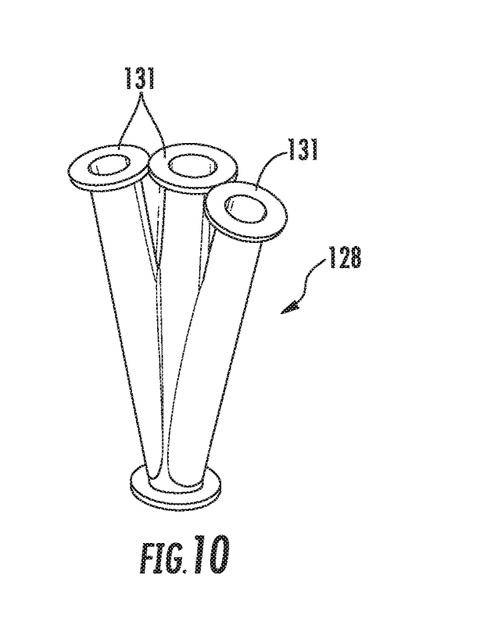
FIG. 10 illustrates a perspective view of one embodiment of a node connector of a tower assembly according to the present disclosure.
Figure 11:
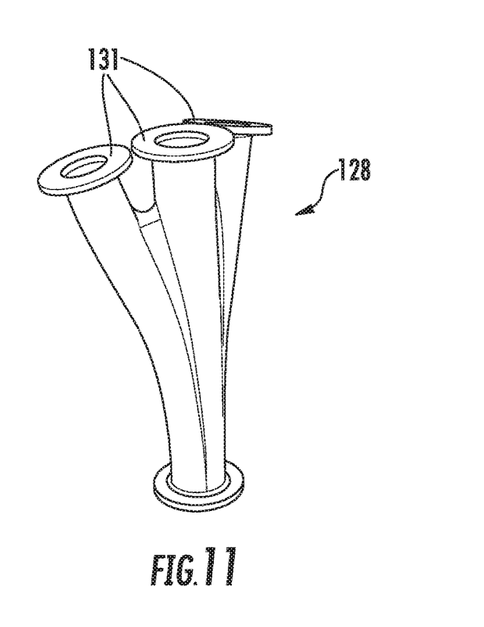
FIG. 11 illustrates a perspective view of another embodiment of a node connector of a tower assembly according to the present disclosure.

Referring now to FIGS. 7-8 and 10-11, the node connectors 128 are configured to join the plurality of supports 118 of the lattice tower portion 114 to the connection structure 130 via the plurality of arm members 132. More specifically, as shown in FIGS. 10 and 11, the node connectors 128 may each include at least three node connections 131. Thus, in certain embodiments, as shown in FIGS. 7 and 8, the tower assembly 102 may include at least four least node connectors 128 spaced evenly apart, with each node connector 128 having at least three node connections 131 so as to provide twelve connection points 133 on the connection structure 130. In further embodiments, the node connectors 128 may include any number of node connections 131 including more than three or less than three node connections 131. As such, the node connectors 128 are effective at transferring the loads effectively from the tubular tower portion 116 to the lattice tower portion 114.

More specifically, as shown in FIGS. 7-8 and 12-14, the tower assembly 102 may include a plurality of flanged components 134 configured with either or both of the plurality of arm members 132 and/or the plurality of supports 118. For example, as shown in FIGS. 7-8, each of the arm members 132 may include a flanged component 134 at each end thereof so as to connect the arm members 132 to the flanges 136 of the connection points 133 of the connection structure 130. More specifically, the flanged components 134 may be joined to the plurality of arm members 132 and/or the plurality of supports 118 via welding, one or more fasteners, or any other suitable means.

Figure 14:
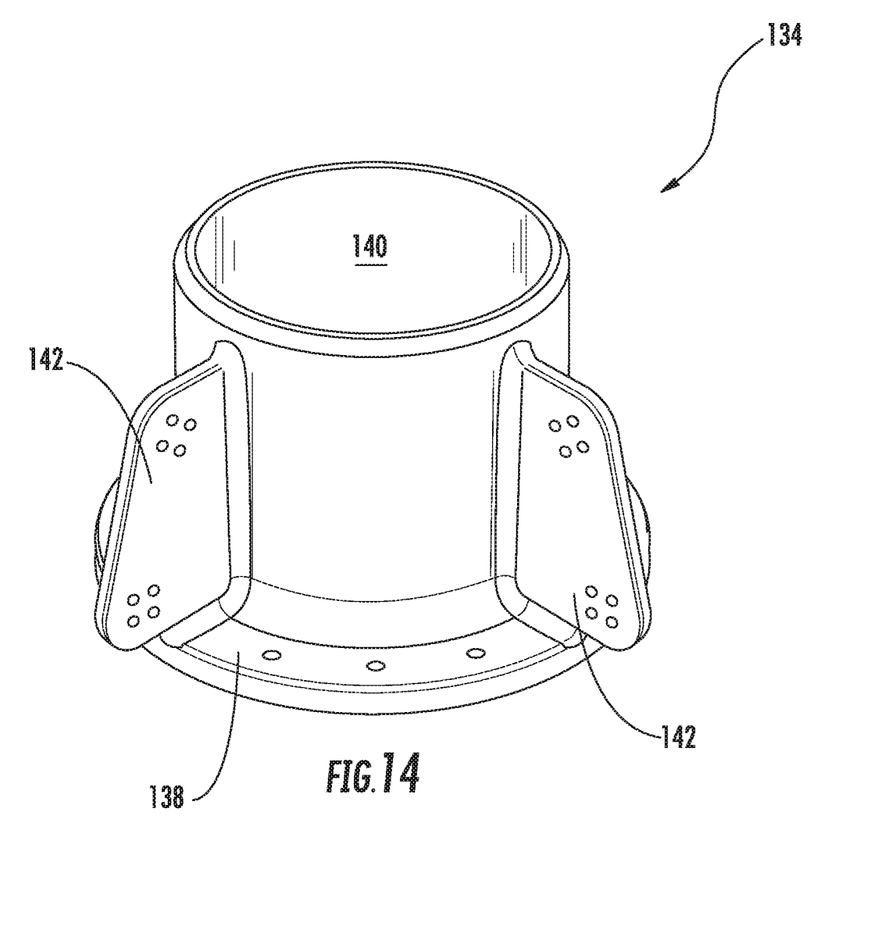
FIG. 14 illustrates a detailed perspective view of one embodiment of a flanged component of a tower assembly according to the present disclosure.

Referring particularly to FIG. 14, the flanged components 134 typically have a corresponding cross-section to that of the arm members 132 and/or the plurality of supports 118. For example, as shown, the cross-section of the flanged components 134 is generally round. In addition, as shown, a first end of the flanged component 134 includes a connection flange 138 configured to be connected to the flanges 136 of the connection points 133 or adjacent flanges 138 of adjacent flange components 134. Further, as shown, an opposing end of the flanged component 134 includes an opening 140 configured to receive the arm members 132 and/or the plurality of supports 118. In addition, as shown, the flange component(s) 134 may include one or more support flanges 142 having one or more attachment locations for the cross-support members 120, 122, 123. Further, in certain embodiments, the support flanges 142 may be configured to prevent the connection flange 138 from deforming.

Figure 17:
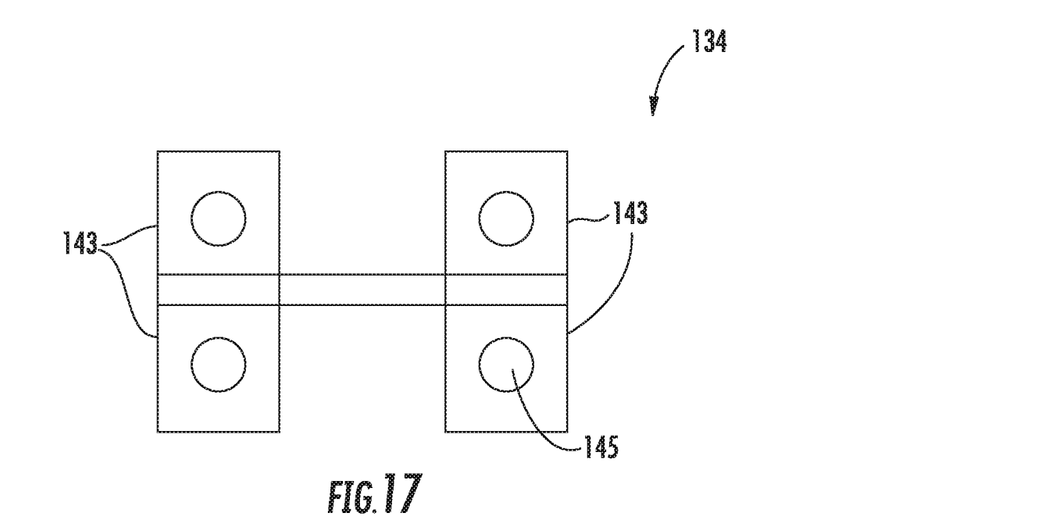
FIG. 17 illustrates a side view of one embodiment of a flanged component of a tower assembly according to the present disclosure.
Figure 18:
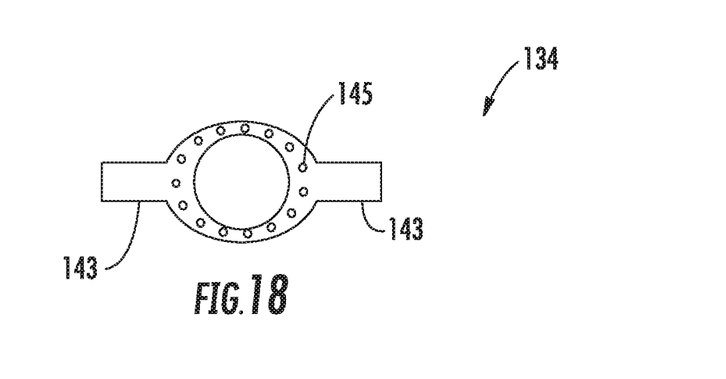
FIG. 18 illustrates a top view of the flanged component of FIG. 17.

Another embodiment of the flanged component 134 is further illustrated in FIGS. 17 and 18. More specifically, as shown, FIG. 17 illustrates a simplified side view of the flanged component 134, whereas FIG. 18 illustrates a simplified top view of the flanged component 134. As shown in the illustrated embodiment, the flanged component 134 may include one or more wings 143 that provide attachment locations for the cross-support members 120, 122, 123, 127, e.g. as illustrated by bolt holes 145.

Figure 12:
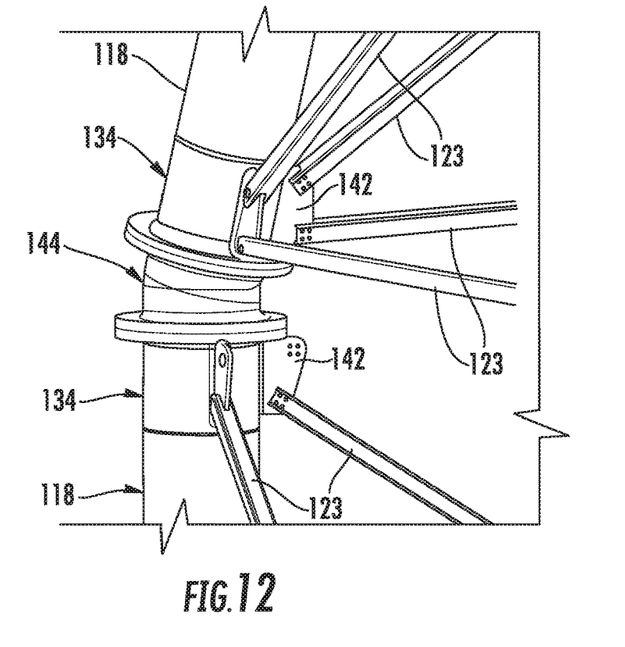
FIG. 12 illustrates a detailed perspective view of one embodiment of a joint location of a tower assembly according to the present disclosure.
Figure 13:
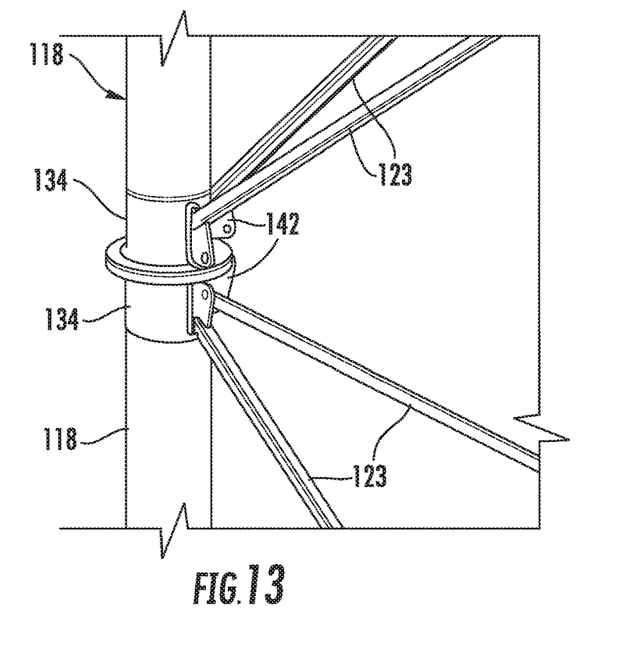
FIG. 13 illustrates a detailed perspective view of another embodiment of a joint location of a tower assembly according to the present disclosure.

Referring now to FIGS. 12 and 13, detailed views of various joint locations of the tower assembly 102 are illustrated. More specifically, as shown in FIG. 13, two flanged components 134 may be directly joined together. Alternatively, as shown in FIG. 13, the tower assembly 102 may also include at least one tapered spacer 144 configured therebetween, e.g. at an upper portion 115 of the lattice tower portion 114 between adjacent flange components 134. Thus, the tapered spacer(s) 144 are configured to angle the supports 118 as the lattice tower portion 114 approaches the transition region 126.

Figure 15:
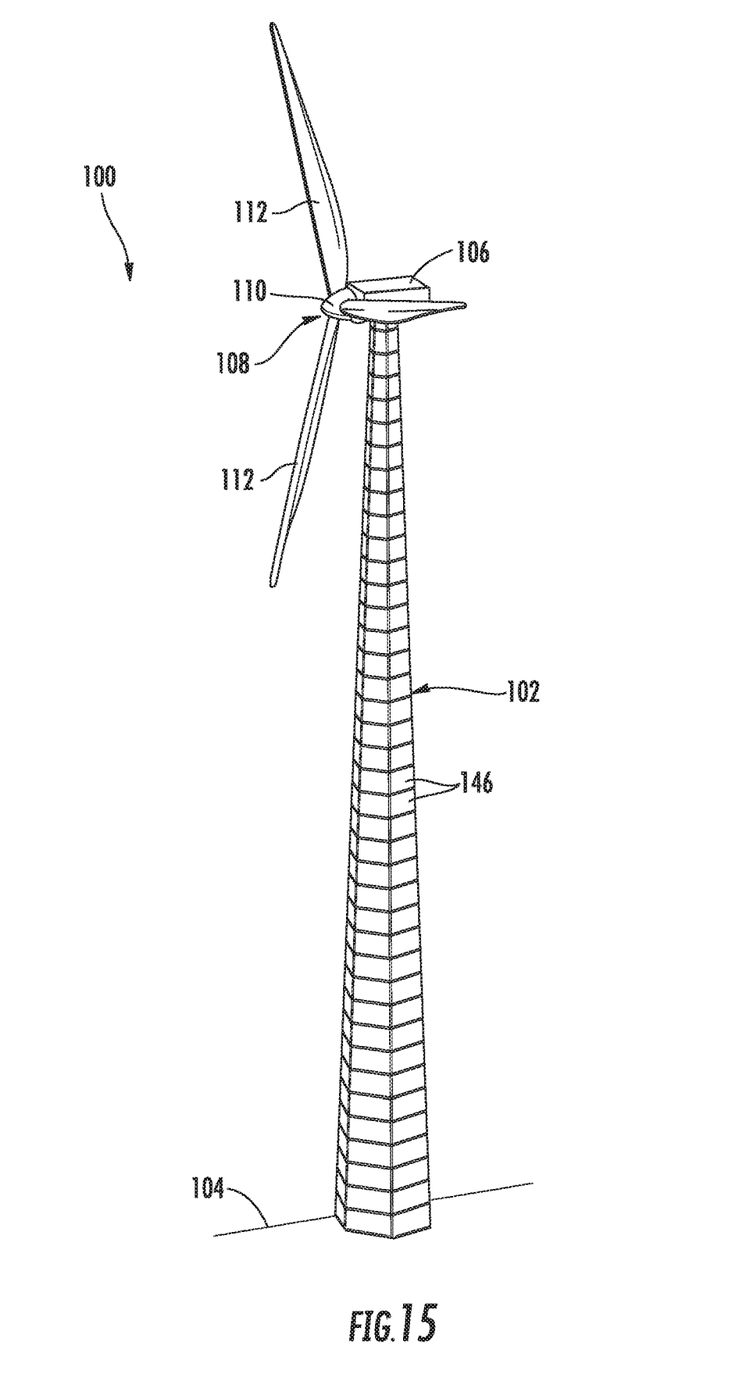
FIG. 15 illustrates a perspective view of another embodiment of a wind turbine having a tower assembly according to the present disclosure.

Referring now to FIG. 15, a perspective view of another embodiment of a wind turbine 100 having a tower assembly 102 according to the present disclosure is illustrated. As shown, the tower assembly 102 extends from the support surface 104 and has a nacelle 106 mounted on the tower assembly 102. Further, the rotor 108 is coupled to the nacelle 106 and includes a rotatable hub 110 and at least one rotor blade 112 coupled to and extending outwardly from the hub 110. In addition, as shown, the tower assembly 102 is configured as a lattice tower structure, such as the lattice tower portion 114 of FIG. 4. Moreover, the tower assembly 102 also includes a plurality of panel elements 146 covering the openings 124 of the support members.

Figure 16:
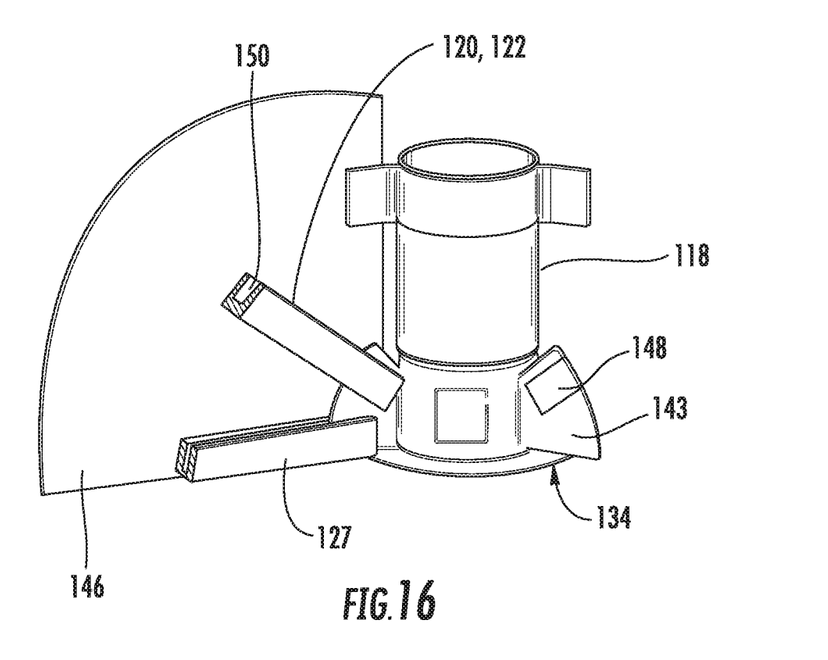
FIG. 16 illustrates an internal, perspective view of one embodiment of a support leg of the tower assembly of FIG. 15 configured with a flanged component and a panel element according to the present disclosure.

More specifically, as shown in FIG. 16, an internal view of one of the support legs 118 of the tower assembly 102 configured with one of the panel elements 146 is illustrated. Further, as shown, the support leg 118 is configured with a flanged component 134 that secures the panel element 146 in place. Moreover, as shown, the horizontal and/or cross support members 120, 122, 123, 127 are mounted to the wings 143 of the flanged component 134. More specifically, as shown, one or more solid blocks 148 may be inserted between the wing(s) 143 of the flanged component 134 and the hollow cross-section(s) 150 of the horizontal and/or cross support members 120, 122, 123, 127 on either side for bolting thereto. It should be understood that the mounting configuration of FIG. 16 may be used with or without the panel elements 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower assembly for a wind turbine, the tower assembly comprising:
   a lattice tower portion comprising a plurality of structural members connected together to define an open lattice tower, the structural members comprising a plurality of supports and a plurality of cross-support members, the plurality of cross-support members being connected between the plurality of supports so as to define one or more openings;
   a tubular tower portion comprising a lower portion and an upper portion;
   a first transition region configured between the lattice tower portion and the tubular tower portion, the first transition region comprising a single-piece casted connection structure, a plurality of arm members, and a plurality of node connectors, the connection structure comprising a circumferential body comprising an upper opening and a lower surface, the lower surface comprising a plurality of connection points each comprising a circumferential flange, each of the plurality of arm members secured to one of the circumferential flanges of one of the connection points, the upper opening configured to receive the lower portion of the tubular tower portion therein, the plurality of node connectors joining the plurality of supports of the lattice tower portion to the plurality of arm members; and
   a plurality of flanged components configured with at least one of the plurality of arm members or the plurality of supports.

2. The tower assembly of claim 1, wherein each of the plurality of arm members comprise one of the flanged components at each end thereof so as to connect the aria members to the circumferential flanges of the connection points of the connection structure.

3. The tower assembly claim 1, wherein the flanged components are joined to at least one of the plurality of arm members or the plurality of supports via at least one of welding or fasteners.

4. The tower assembly of claim 1, further comprising one or more panel elements, wherein the flanged components further comprise at least one wing, And wherein at least one of the plurality of arm members or he plurality of supports are mounted to the at least one wing of the flanged component and the one or more panel elements.

5. The tower assembly of claim 4, wherein at least one of the plurality of arm members or at least one of the plurality of supports comprise a hollow cross-section having a solid block configured therein, wherein a portion of the arm members or a portion of the supports containing the solid block is mounted to the wing.

6. The tower assembly of claim 1, further comprising at least one tapered spacer configured at an upper portion of the lattice tower portion between adjacent flange components.

7. The tower assembly of claim 1, wherein the node connectors comprises at least three node connections.

8. The tower assembly of claim 7, further comprising at least four least node connectors spaced evenly apart, each of the lode connectors comprising at least three node connections.

9. The tower assembly of claim 1, further comprising a second transition region configured between the tubular tower portion and a nacelle of the wind turbine, the second transition region comprising a tubular portion that tapers in diameter towards the nacelle.

10. A wind turbine, comprising:
    a tower assembly comprising:
      a lattice tower portion comprising a plurality of structural members connected together to define an open lattice tower, the structural members comprising a plurality of supports,
      a tubular tower portion comprising a lower portion and an upper portion,
      a first transition region configured between the lattice tower portion and the tubular tower portion, the first transition region comprising a casted single-piece connection structure, a plurality of arm members, and a plurality of node connectors, the connection structure comprising a circumferential body comprising an upper opening and a lower surface, the lower surface comprising a plurality of connection points each comprising a circumferential flange, each of the plurality of arm members secured to one of the circumferential flanges of one of the connection points, the upper opening configured to receive the lower portion of the tubular tower portion therein, the plurality of node connectors joining the plurality of supports of the lattice tower portion to the plurality of arm members, and a plurality of flanged components configured with at least one of the plurality of arm members or the plurality of supports:

a nacelle mounted atop the tower assembly; and, a rotor comprising a rotatable hub and at least one rotor blade.

11. A tower assembly, comprising: a first tower portion comprising a plurality of supports; a second tower portion comprising a lower portion and an upper portion; and, a transition region configured between the first and second portions, the transition region comprising a casted single-piece connection structure, a plurality of arm members, and a plurality of node connectors, the connection structure comprising a circumferential body comprising an upper opening and a lower surface, the lower surface comprising a plurality of connection points each comprising a circumferential flange, each of the plurality of arm members secured to one of the circumferential flanges of one of the connection points, the upper opening configured to receive the lower portion of the second tower portion therein, the plurality of node connectors joining the plurality of supports of the first tower portion to the plurality of arm members; and a plurality of flanged components configured with at least one of the plurality of arm members or the plurality of supports.

12. The tower assembly of claim 11, wherein each of the plurality of arm members comprise one of the flanged components at each end thereof so as to connect each of the plurality of arm members to the circumferential flanges of the connection points of the connection structure.

13. The tower assembly of claim 11, wherein the flanged components are joined to at least one of the plurality of arm members or the plurality of supports via at least one of welding or fasteners.

* * * * *